US006983417B2

(12) United States Patent
Kagimasa et al.

(10) Patent No.: US 6,983,417 B2
(45) Date of Patent: Jan. 3, 2006

(54) METHOD AND SYSTEM FOR MANAGING DOCUMENTS

(75) Inventors: Hideko Kagimasa, Yokohama (JP); Toru Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 09/924,590

(22) Filed: Aug. 9, 2001

(65) Prior Publication Data
US 2002/0078104 A1    Jun. 20, 2002

(30) Foreign Application Priority Data
Dec. 14, 2000  (JP)  ............... 2000-384902

(51) Int. Cl.
*G06F 15/00* (2006.01)
(52) U.S. Cl. ............... 715/530; 715/511; 707/203
(58) Field of Classification Search ............ 715/530, 715/511, 501.1, 531; 707/203
See application file for complete search history.

(56) References Cited
U.S. PATENT DOCUMENTS

| | | | | |
|---|---|---|---|---|
| 5,640,544 A | * | 6/1997 | Onodera et al. | ............ 715/500 |
| 5,781,915 A | * | 7/1998 | Kohno et al. | ............... 715/511 |
| 6,014,677 A | * | 1/2000 | Hayashi et al. | .......... 707/104.1 |
| 6,438,548 B1 | * | 8/2002 | Grim et al. | .................... 707/8 |
| 6,505,219 B1 | * | 1/2003 | MacLean et al. | ........... 715/530 |
| 6,610,104 B1 | * | 8/2003 | Lin et al. | ..................... 715/511 |
| 6,631,495 B2 | * | 10/2003 | Kato et al. | ................... 715/500 |
| 6,721,921 B1 | * | 4/2004 | Altman | ....................... 715/512 |
| 6,757,871 B1 | * | 6/2004 | Sato et al. | ................... 715/530 |

FOREIGN PATENT DOCUMENTS

JP          10-83386          3/1998

* cited by examiner

Primary Examiner—William Bashore
Assistant Examiner—Maikhanh Nguyen
(74) Attorney, Agent, or Firm—Mattingly, Stanger, Malur & Brundidge, P.C.

(57)    ABSTRACT

In a document information management system, an editable form of document information and a reference-only form of the document information are managed. Document information is offered in only the editable form to users desiring updating of document information. When this document information is utilized, a subsequent utilization state of the document information is followed.

5 Claims, 18 Drawing Sheets

FIG. 2

DOCUMENT TABLE DISPLAY

| DOCUMENT ID | DOCUMENT NAME | CREATION DATE | CREATOR | UTILIZATION POINT | OPERATION COMMAND | | |
|---|---|---|---|---|---|---|---|
| ... | | | | | | | |
| D003 | CATALOGUE | 1999/12/10 | N | 5 | REFERENCE | UTILIZATION | UTILIZATION STATE |
| ... | | | | | | | |
| D005 | DELIBERATION DOCUMENT | 1999/12/15 | S | 0 | REFERENCE | UTILIZATION | UTILIZATION STATE |
| ... | | | | | | | |
| D007 | PROPOSAL XYZ | 1999/12/25 | M | 10 | REFERENCE | UTILIZATION | UTILIZATION STATE |
| ... | | | | | | | |

FIG. 3

MAIL ADDRESS INPUT

INPUT MAIL ADDRESS

MAIL ADDRESS : A@xxx.co.jp

[ OK ]  [ CANCEL ]

FIG. 4

| PROPERTY NAME | VALUE |
|---|---|
| DOCUMENT ID | D007 |
| CREATION DATE | 1999/12/25 |
| CREATOR | M |
| DOCUMENT NAME | PROPOSAL XYZ |
| UPDATING DATE | – |
| UPDATING PARTY | – |
| UPDATING VERSION NUMBER | R1 |
| FILE NAME OF MASTER RENDITION | M.doc |
| FILE FORM OF MASTER RENDITION | WORD |
| FILE NAME OF SUB-RENDITION | M.pdf |
| FILE FORM OF SUB-RENDITION | PDF |
| MAIL ADDRESS | M@xxx.co.jp |
| UTILIZATION POINT | 10 |
| POINTER TO DOCUMENT UTILIZATION INFORMATION | (DOCUMENT UTILIZATION INFORMATION) |
| POINTER TO REVIEW INFORMATION | (REVIEW INFORMATION) |
| KIND OF PUBLICATION | HANDLE WITH CARE |

FIG. 8

| UTILIZA-TION ID | UTILIZING PARTY | UTILIZATION DATE | MAIL ADDRESS | REVIEW SUBMISSION TERM | REVIEW COMPLETION TERM | REVIEW CONDITION |
|---|---|---|---|---|---|---|
| ... | | | | | | |
| U015 | A | 2000/01/10 | A@xxx.co.jp | 2000/01/24 | 2000/02/10 | UNDER SUBMISSION |
| ... | | | | | | |

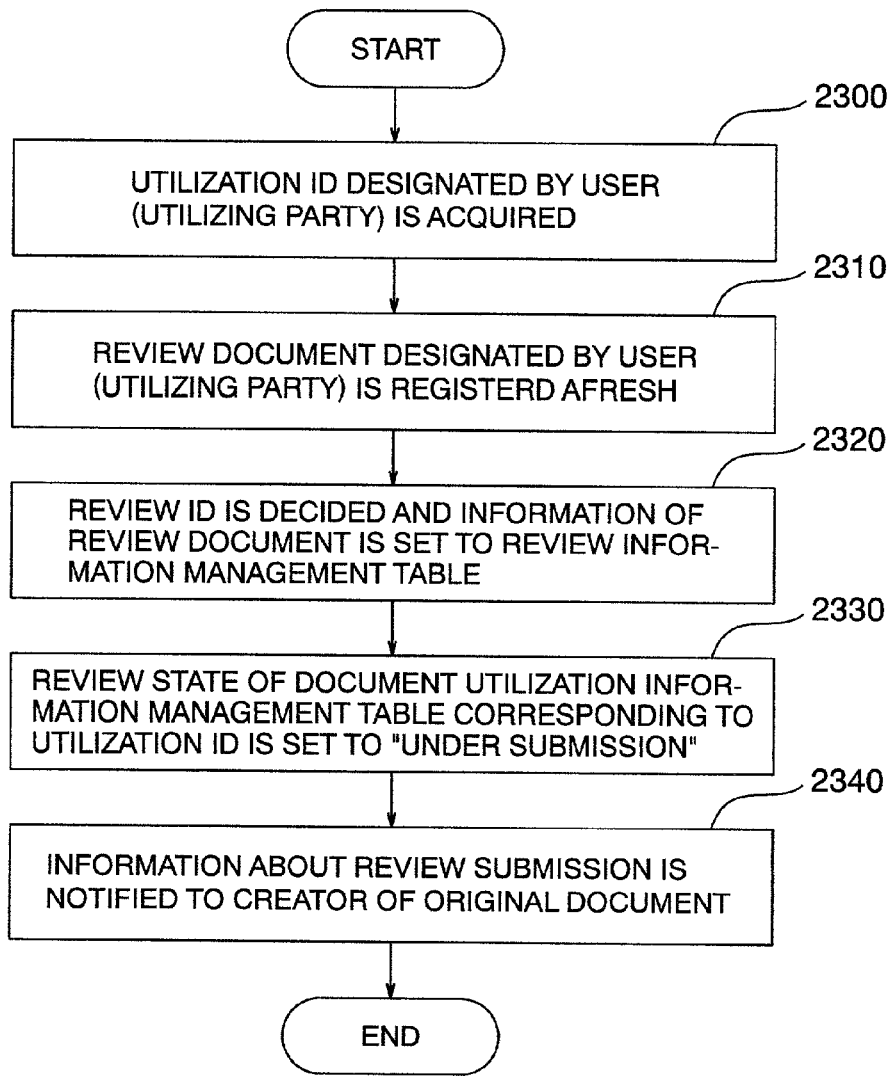

FIG. 13

| PROPERTY NAME | VALUE |
|---|---|
| DOCUMENT ID | D055 |
| CREATION DATE | 2000/01/15 |
| CREATOR | A |
| UPDATING DATE | – |
| UPDATING PARTY | – |
| UPDATING VERSION NUMBER | R1 |
| DOCUMENT NAME | PROPOSAL ABC |
| FILE NAME OF MASTER RENDITION | A.doc |
| FILE FORM OF MASTER RENDITION | WORD |
| FILE NAME OF SUB-RENDITION | – |
| FILE FORM OF SUB-RENDITION | – |
| MAIL ADDRESS | A@xxx.co.jp |
| UTILIZATION POINT | – |
| POINTER TO DOCUMENT UTILIZATION INFORMATION | – |
| POINTER TO REVIEW INFORMATION | (REVIEW INFORMATION) |

FIG. 14

| PROPERTY NAME | VALUE |
|---|---|
| DOCUMENT ID | D055 |
| CREATION DATE | 2000/01/15 |
| CREATOR | A |
| UPDATING DATE | 2000/01/20 |
| UPDATING PARTY | A |
| UPDATING VERSION NUMBER | R2 |
| DOCUMENT NAME | PROPOSAL ABC |
| FILE NAME OF MASTER RENDITION | A.doc |
| FILE FORM OF MASTER RENDITION | WORD |
| FILE NAME OF SUB-RENDITION | A.pdf |
| FILE FORM OF SUB-RENDITION | PDF |
| MAIL ADDRESS | A@xxx.co.jp |
| UTILIZATION POINT | – |
| POINTER TO DOCUMENT UTILIZATION INFORMATION | – |
| POINTER TO REVIEW INFORMATION | (REVIEW INFORMATION) |

FIG. 19

| UTILIZA-TION ID | UTILIZING PARTY | UTILIZATION DATE | MAIL ADDRESS | REVIEW SUBMISSION TERM | REVIEW COMPLETION TERM | REVIEW CONDITION |
|---|---|---|---|---|---|---|
| ... | | | | | | |
| U020 | A | 2000/01/12 | A@xxx.co.jp | 2000/01/26 | 2000/02/12 | COMPLETION |
| ... | | | | | | |

FIG. 20

| REVIEW ID | DOCUM-ENT ID | ORIGINAL DOCUMENT ID | UTILIZATION ID | REVIEW SUBMISSION DATE | REVIEW COMPLETION DATE |
|---|---|---|---|---|---|
| ... | | | | | |
| R005 | D055 | D007 | U015 | 2000/01/15 | 2000/01/21 |
| | | D003 | U020 | 2000/01/15 | 2000/01/16 |
| ... | | | | | |

METHOD AND SYSTEM FOR MANAGING DOCUMENTS

BACKGROUND OF THE INVENTION

This invention relates to a method and system for managing documents by opening document information to the public over a computer network and allowing the public to share the document information.

As computer networks have become wide spread in recent years, everyone has now become able to gain direct access to information laid open to public. Due to such a change of the social environment, persons can individually open their information to the public and can more easily appeal their characters and achievements. At the same time, since everyone can share individual achievements, information, know-how and knowledge thus opened to the public, intellectual productivity of organizations can be improved as a whole.

Also, a framework that allows persons to freely transmit their own information has been established with the progress of communication network technologies. For instance, persons can now transmit information to the world through electronic news, electronic mail, WWW, and so forth.

Such a computer network functions as an infrastructure of information sharing. The progress of such network has accelerated the establishment of the infrastructures, but the latter merely provides a necessary condition of information sharing but does not necessarily promote information sharing itself.

As individual members mutually open to the public those information, knowledge, know-how, etc, that they have individually accumulated and managed to improve their own intellectual productivity, information sharing may provide the effect of improving intellectual productivity of a group as a whole.

Electronic boards on computer networks and home pages of the Internet have been used as means for sharing information on the computer networks. When records of reference to the open information are counted, the party that opens the information to the public can grasp to a certain extent the reaction to the open information.

As described above, however, the computer network itself merely facilitates information sharing, and the preparation of the computer network does not directly promote information sharing and the improvement of intellectual productivity of the whole group. In other words, even when information is opened to the public through the computer network, the information is utilized immediately. Even when the information is merely opened to the public and can be looked up by the group, it cannot be said that the information is really shared and does not result in the improvement of intellectual productivity of the group unless it is utilized in practice.

JP-A-10-83386 discloses an information sharing assistance system that clarifies the degree of contribution to the improvement of intellectual productivity of the whole group and can promote sharing of public information by opening information to the public as described above.

On the other hand, the information electronically opened to the public has the feature that it can be easily copied and processed and can be offered to third parties. When individuals combine information offered by others and process such information, they can create information having a new value that does not exist in the original information, and transmit again the new information. When such a process is repeated, a plurality of people can verify, add and correct the information and can thus create new information that is more concentrated and has higher utility.

A practical problem here is that the original information is often utilized against the intention of the original information transmitter. Receivers of information look up the information either intentionally or unintentionally against the intention of the transmitter of the original information, apply perverted interpretation or wrong evaluation and again transmit the information, lowering the value of the original information.

A group-ware is known as systems for assisting creation of an electronic board and a group document as a creative group work by a plurality of users. However, these systems can certainly assist members to comment on the document submitted to a common work space but cannot assist communication of information in such a form that individual members collect information stored in their own sites, edit the information and combine the information with other information to create information to which a new value is added. These systems cannot cope with the problem of re-utilization of the information against the intention of the transmitter, either.

In permission management in a file system on a network, it is possible to authorize others to gain access to the information of an individual. However, it is not possible to impart authorization, that permits others gaining access to the information to re-utilize the information, to the information. The owner of the information has no way to know even when the information is re-utilized without notice.

As described above, according to the conventional method, whether or not the user asks the owner of the information the permission to re-utilize the information is left to the user's discretion, and time and labor to ask the permission hinder smooth circulation of the information for the user who deliberately asks the permission.

When the user re-utilizes the information without permission, circulation of the information gives no merit to the owner of the information unless the owner is aware of it. When the owner becomes later aware of the circulation, futile time and labor are necessary for both owner and user because the problem of re-utilization of the information against the intention of the owner occurs in many cases as described above.

SUMMARY OF THE INVENTION

As explained above, the conventional information sharing system has no mechanism for confirming whether or not documents opened to the public are really utilized. Therefore, any incentive cannot be given to the provider of the information depending on quality of the information, and information sharing cannot easily be promoted.

The conventional information sharing system is devoid of a mechanism for checking user's business information and client information to outflow to third parties or to competitive companies when documents of a "handle-with-care" class are re-utilized. Therefore, the user often feels uncertain of opening of the information to the public and hesitates to offer the document, so that information sharing cannot be promoted.

In view of the problems described above and to more effectively activate information sharing/knowledge sharing, it is an object of the present invention to provide a document information management method capable of grasping and confirming whether or not a document is merely browsed but is fully re-utilized as a material.

It is another object of the present invention to provide a document information management method capable of confirming a re-utilization state of a created document after utilization when a document containing confidential subjects such as client information is re-utilized, in view of impediment factors on the information provider side.

To accomplish these objects, a document information management method according to the present invention manages an editable form of a document and a reference-only form of the document, and provides the document in the editable form to only users who desire to utilize the document. When the document is utilized (or updated), the document information management method of the present invention traces and manages the utilization state of this document. In consequence, the method of the present invention not only accomplishes information sharing but can offer a high incentive to users providing documents having higher quality, can thus promote positive (promotion) factors on the document provider side and can promote and activate information sharing.

When providing a document in the editable form to users desiring to utilize the document, the document information management method of the present invention notifies the creator of the document of the information of users of the document. In consequence, a higher incentive of document registration can be given to the user providing a document having higher utility, so that the positive (promotion) factors on the document provider side can be accelerated, and information sharing can be promoted and activated.

BRIEF DESCRIPTION OF THE DRAWINGS

FIG. 2 is a table showing an example of a document table display screen in the document management system described above;

FIG. 3 shows an example of an input screen of a mail address in the document management system described above;

FIG. 4 shows an example of properties of document data in the document management system described above;

FIG. 8 shows an example of a document utilization information management table in the document management system described above;

FIG. 9 is flowchart showing a procedure of a document review submission processing in the document management system described above;

FIG. 10 shows an example of a document review information management table in the document management system described above;

FIG. 13 shows properties of document data at the time of review submission in the document management system described above;

FIG. 14 shows properties of document data at registration after completion of review in the document management system described above;

FIG. 19 shows an example of a document utilization information management table in the document management system according to the third embodiment;

FIG. 20 shows an example of a review information management table in the document management system according to the third embodiment.

DESCRIPTION OF THE EMBODIMENTS

Hereinafter, preferred embodiments of the present invention will be explained in detail. However, these embodiments limit in no way the present invention.

Figure 1:
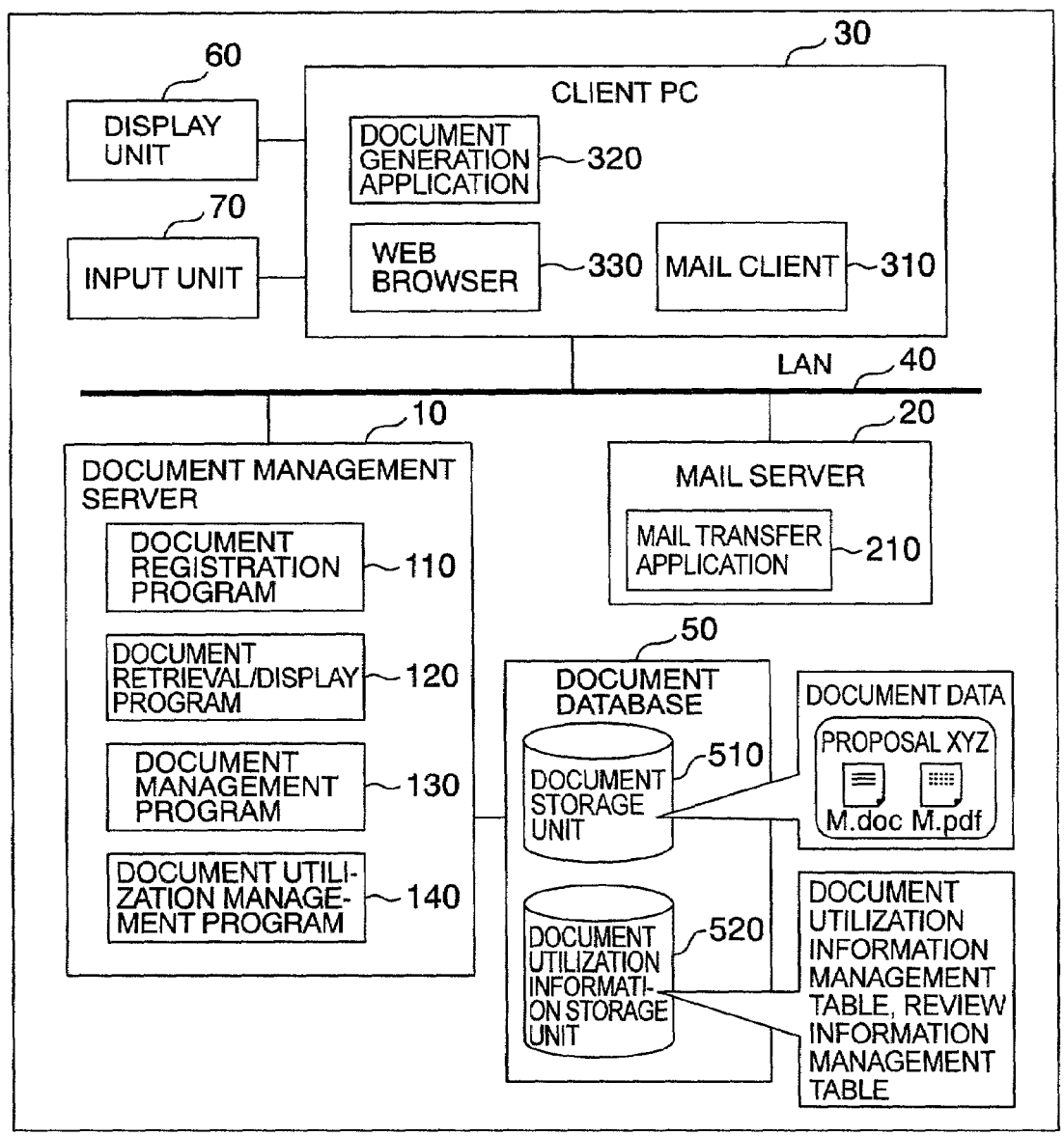
FIG. 1 is a block diagram showing as a whole a construction of a document management system according to an embodiment of the present invention.

FIG. 1 is a block diagram showing a construction of a document management system according to the first embodiment of the present invention. The document management system shown in this drawing includes a document management server 10, a mail server 20 and a client PC 30 that are connected by a network 40 such as LAN, Internet, a public line, or the like. The document management server 10 includes a document database 50, a document registration program 110 for controlling the document database 50, a document retrieval/display program 120, a document management program 130 and a document utilization management program 140.

The mail server 20 includes a mail transfer application 210. The mail transfer application 210 transfers mail data to the document management server 10.

In this embodiment, the document management program 130 controls the operations such as reception of the main data transferred by the mail transfer application 210, registration to the document database 50 and updating.

The client PC 30 includes a mail client 310, a document generation application 320, a Web browser 330, a display unit 60 and an input unit 70. Here, the mail client 310 exchanges data with the mail server 20 through the network and the Web browser 330 exchanges data with each program inside the document management server.

The document database 50 includes a document storage unit 510 and a document utilization information storage unit 520. The document storage unit 510 stores document data and the document utilization information storage unit 520 stores a document utilization information management table and a review information management table.

The above explains the construction of the document management system of this embodiment.

The document management system in this embodiment accomplishes a method by which a user registers a document to the document database 50 through the Web browser 330, and a method that automatically registers a document to the document database 50 through transmission/reception of mail. The latter, that is, the document management system for automatically registering the document to the document database 50 through transmission/reception of mail (hereinafter called "mail document automatic registration system") is not proposed here. The mail document automatic registration system specifically takes up electronic mail that has become rapidly spread in recent years as an information infrastructure, and manages the information transmitted and received through the electronic mail as a series of business history. Further, in the mail document automatic registration system, the history of updating of annexed files during the transmission/reception process of the electronic mails is displayed so that the user can collate the mail exchange with the updating state of the annexed document and can precisely grasp the decision process of intention about a series of certain themes.

Initially, the concept of data management in the document management system of this embodiment will be explained.

In the document management system of this embodiment, transmission and reception of individual electronic mails users exchange about different subjects (themes, jobs) are managed by the concept "matter". The "matter" is defined as one coherent unit of the subject about which the mails are exchanged. It will be assumed that a certain user transmits a mail about a novel subject and starts discussion, one "matter" is formed, and the mails the user exchanges with others are gathered as one unit as the "matter". Since such a concept is provided, all the users who are involved in transmission and reception of the mails about a certain discussion subject can be managed as one group inclusive of the electronic mails transmitted and received among other users.

In this embodiment, the mails are managed in the matter unit. The matter is defined as a "unit for gathering the group of electronic mails associated with a certain subject". When the electronic mail data is stored in such a management unit, the electronic mails can be classified in accordance with the theme of discussion.

The above explains the concept of data management in the document management system in this embodiment.

Next, a procedure required for the document management server 10 to acquire the electronic mail from the mail server 20 will be explained. First, the user transmits the electronic mail to initiate a series of processing. In this document management system, the mails as the object of management are distinguished from ordinary mails and are called "business mails". To transmit the business mail, the user puts identification information in accordance with a rule determined in advance and then transmits the business mail. Identification information can be put to a title, a text, an attached document or a mail address. When the identification information is described in the mail title, for example, identification information such as "0001" or "business 0001" may be inserted into the title. In this case, "0001" represents the matter number.

When a matter is started afresh, identification information such as a quotation " " or "business" may be merely inserted into the title. In this case, a new matter number (which is called "number allocation processing") is allocated in the document management server 10, and after the identification number is changed to "0001" or "business 0001", the mail is transmitted to the mail address.

When the mail client 310 of the client PC transmits the electronic mail data to the mail server 20, the mail transfer application 210 is started up and judges whether or not the electronic mail data has the identification information representative of the management object of the document management server 10. Only when the electronic mail data is found as the management object, the electronic mail data is passed to the document management program 130. The document management program 130 analyzes the content of the electronic mail data and registers it to the document database 50. Subsequently, the document management program 130 transfers the electronic mail data to the mail server 20. The mail server 20 executes the transmission processing of the electronic mail data in accordance with the designated address.

The above explains the procedure required for the document server to acquire the electronic mail.

The document registration program 110 registers the document data inputted from the client PC 30 through the Web browser 330 to the document database 50. The document management system according to this embodiment manages multi-rendition of the document. The term "multi-rendition management" of the document means management that registers files of a plurality of forms to one document and manages them. Consequently, information sharing can be accomplished in conformity with the user's object so that a file of the form that can only be looked up is offered to a user who desires to look up a document, and a file of the form that can be edited is offered to a user who desires to edit a document and re-utilizes it.

The document retrieval/display program 120 retrieves the data stored in the document database 50 in accordance with the retrieval condition requested from the client PC 30 through the Web browser 330, and displays the retrieval result on the Web browser 330 of the client PC 30.

The document utilization/management program records the history how the documents registered to the document database are utilized, and manages the information for grasping the utilization of the documents as the material from the aspect of re-utilization of the documents. When confidential documents are utilized, the document utilization/management program records and manages the necessity of review of the utilization of the documents and the execution condition. As to the review of the documents, this program manages the execution term and urges the person creating the document to execute the utilization review.

Next, a display method of the document retrieval/display program 120 in this embodiment will be explained. FIG. 2 shows an example of a document table display screen that the document retrieval/display program 120 displays as the retrieval result. The document information in a matter table display table includes a document ID, a document name, a creation date, a creator name and a utilization point. When the document ID is "D007", for example, the document retrieval/display program 120 represents that a creator "M" has registered a document "Proposal XYZ" on "Dec. 25, 1999". The utilization point "10" represents that this document has been utilized ten times. The utilization point makes it possible to confirm that the document has not merely been browsed but has actually been utilized as the material. Therefore, the user can judge significance of this document, too. When the user clicks the browsing button of the document ID "D007" on the document table display screen, the document of the proposal XYZ is displayed in the form for which only browsing is possible. When the user clicks the utilization button, on the other hand, the mail address input screen of the user shown in FIG. 3 is displayed. When the user inputs the mail address and then clicks the OK button on this screen, the document of the proposal XYZ is displayed in the form that can be edited. When the user clicks the utilization condition button on the screen, the name of the person utilizing the document and the date of utilization are displayed. In addition, the execution term of review and the execution condition are displayed.

The above explains the outline of the display method of the document retrieval/display program 120 in this embodiment.

Next, the data stored in the document database 50 in this embodiment will be explained. FIG. 4 shows the properties of document data. The document data includes a document ID, a creation date, a creator name, a document name, an updating date, a name of an updating person, an updating history number (version number), a file name of a master rendition, a file form of the master rendition, a file name of a sub-rendition, a file form of the sub-rendition, a mail address, a utilization point, a pointer to document utilization information, a pointer to review information and kind of publication. The property values in FIG. 4 typically represent the values of the "Proposal XYZ" on the document table display screen in FIG. 2. It can be understood that the file form of the master rendition is Word and the file form of the sub-rendition is PDF. Therefore, when this "Proposal XYZ" is looked up, the Word file is opened and when it is utilized, the PDF file is opened. The property of the kind of publication indicates the value "handle with care". This remark represents that confirmation must be made as to whether or not any problem exists by reviewing a new creation document after utilization in consideration of the impediment factor on the document offering side. This property is effective in the case of a document containing a confidential matter or client information, for example. This embodiment employs a method for securing communication means at the time of review by inputting the mail address as shown on the screen of FIG. 3.

The above explains the properties of the document data in this embodiment.

Figure 5:
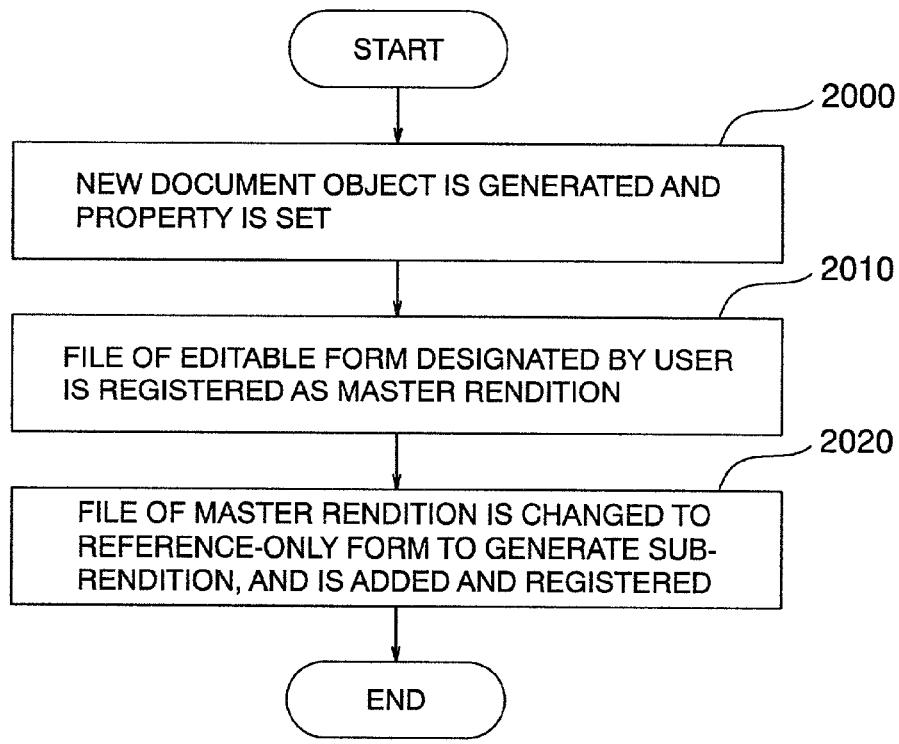
FIG. 5 is a flowchart showing a procedure of a document new registration processing in the document management system described above.

Next, a concrete example of the document registration processing in the document registration program 110 of this embodiment will be explained with reference to the flowchart in FIG. 5.

Step 2000:
A new document object is generated and properties are set.

Step 2010:
A file of an editable form designated by the user is registered as the master rendition.

Step 2020:
The file of the master rendition is converted to the referable form to generate the sub-rendition, and is additionally registered.

In the case of the "Proposal XYZ" shown in FIG. 4, the master rendition is the editable "Word" and the sub-rendition is "PDF" capable of only reference.

The above explains a concrete processing procedure of the document registration processing of the document registration program 110 in this embodiment.

Figure 6:
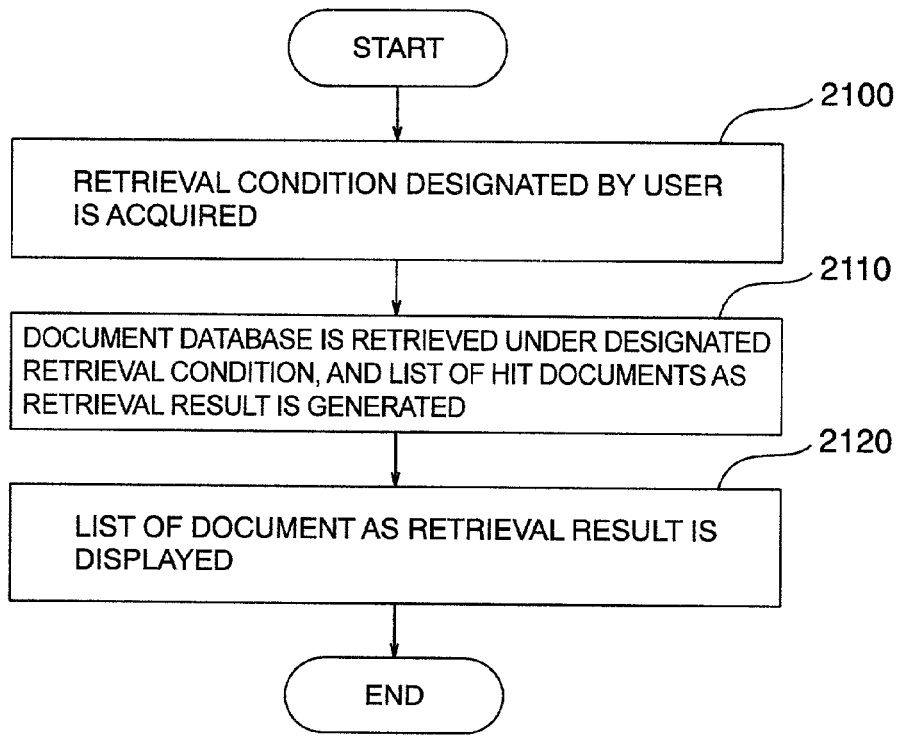
FIG. 6 is flowchart showing a procedure of a document retrieval/display processing in the document management system described above.

Next, a concrete processing procedure of the document retrieval/display program 120 in this embodiment will be explained with reference to the flowchart shown in FIG. 6.

Step 2100:
A retrieval condition designated by the user is acquired.

Step 2110:
The document database is retrieved under the designated retrieval condition, and a list of hit documents is generated as a result of retrieval.

Step 2120:
A list of the documents is displayed as a result of retrieval.

In the document management system of this embodiment, the conditions of the full retrieval of the text and the concept retrieval can be designated as the retrieval condition, too, besides the properties of the document data shown in FIG. 4. Further, abundant retrieval conditions directed to the matter, the mail, the attached documents of the mail, and so forth, can also be designated as the retrieval function of the mail document automatic registration system.

The above explains the concrete processing procedure of the document retrieval processing of the document retrieval/display program 120 in this embodiment.

Next, a concrete processing procedure of the document utilization processing of the document utilization management program 140 in this embodiment will be explained with reference to the flowchart shown in FIG. 7.

Step 2200:
A user mail address designated by the user (utilizing party) is acquired.

Step 2210:
A utilization ID is decided on the basis of the original document, and the document utilization information management table is updated.

Step 2220:
A review execution term (submission term, completion term) is calculated on the basis of the utilization date and is added to the document utilization information management table.

Step 2230:
Information on the review execution term and the creator of the original document is displayed.

Step 2240:
The file of the master rendition (of the editable form) of the original document is displayed.

Step 2250:
Utilization information is notified to the creator of the original document.

Figure 7:
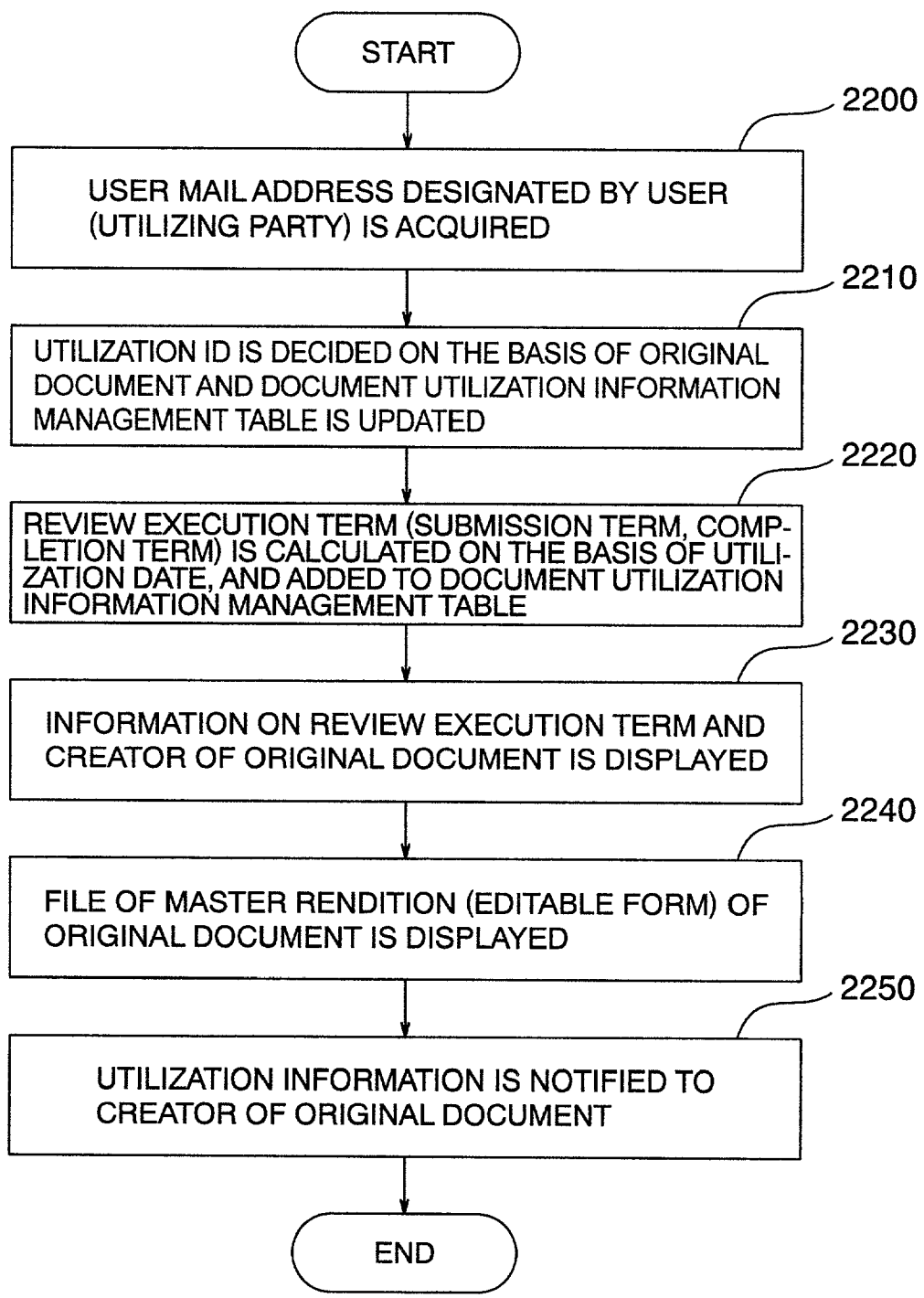
FIG. 7 is flowchart showing a procedure of a document utilization processing in the document management system described above.

The document utilization processing shown in FIG. 7 is the processing that is started up when the operation button is clicked on the document list display screen in FIG. 2.

The above explains the concrete processing procedure of the document utilization processing of the document utilization management program 140 in this embodiment.

Next, the document utilization information management table that is updated by the document utilization management program 140 in this embodiment will be explained. FIG. 8 shows a concrete example of the document utilization information management table. The document utilization information management table stores information such as a utilization ID, a utilizing party, a utilization date, a mail address, a review submission term, a review completion term, a review condition, and so forth. The content shown in FIG. 8 represents an example where a user "A" utilizes a "Proposal XYZ" on "Jan. 10, 2000". The "review submission term" is set to two weeks after the date of utilization and the "review completion term", to one month after the date of utilization. These terms can be changed appropriately. A system manager can define the reference, and can further set them for each user and for each document. The document utilization management program 140 can monitor the review execution condition of the users on the basis of the "review execution term". In this case, the document utilization management program 140 can promote review execution of the document by sending beforehand a confirmation notice to users several days or the day before the term. Values "non-submission"→"under submission"→"completion" are set and updated in the "review condition" in accordance with each phase of review.

The above explains the document utilization information management table that the document utilization management program 140 of this embodiment updates in the document utilization processing.

Next, a concrete processing procedure of the document review submission processing of the document utilization management program 140 in this embodiment will be explained with reference to the flowchart shown in FIG. 9.

Step 2300:
Utilization ID designated by the user (utilizing party) is acquired.

Step 2310:
A review document designated by the user (utilizing party) is registered afresh.

Step 2320:
Review ID is decided and information of the review document is set to the review information management table.

Step 2330:
The review condition of the document utilization information management table corresponding to the utilization ID is set to "under submission".

Step 2340:
The information about review submission is notified to the creator of the original document.

The above explains a concrete processing procedure of the document review submission processing of the document utilization management program 140 in this embodiment.

Next, the review information management table that the document utilization management program 140 of this embodiment updates in the document review submission processing will be explained. FIG. 10 shows a concrete example of the review information management table. The review information management table stores information such as a review ID, a document ID, an original document ID, a utilization ID, a review submission date, a review completion date, and so forth. The content shown in FIG. 10 represents an example where a user "A" conducts review submission on "Jan. 15, 2000".

The above explains the document utilization information management table that the document utilization management program 140 in this embodiment updates.

Figure 11:
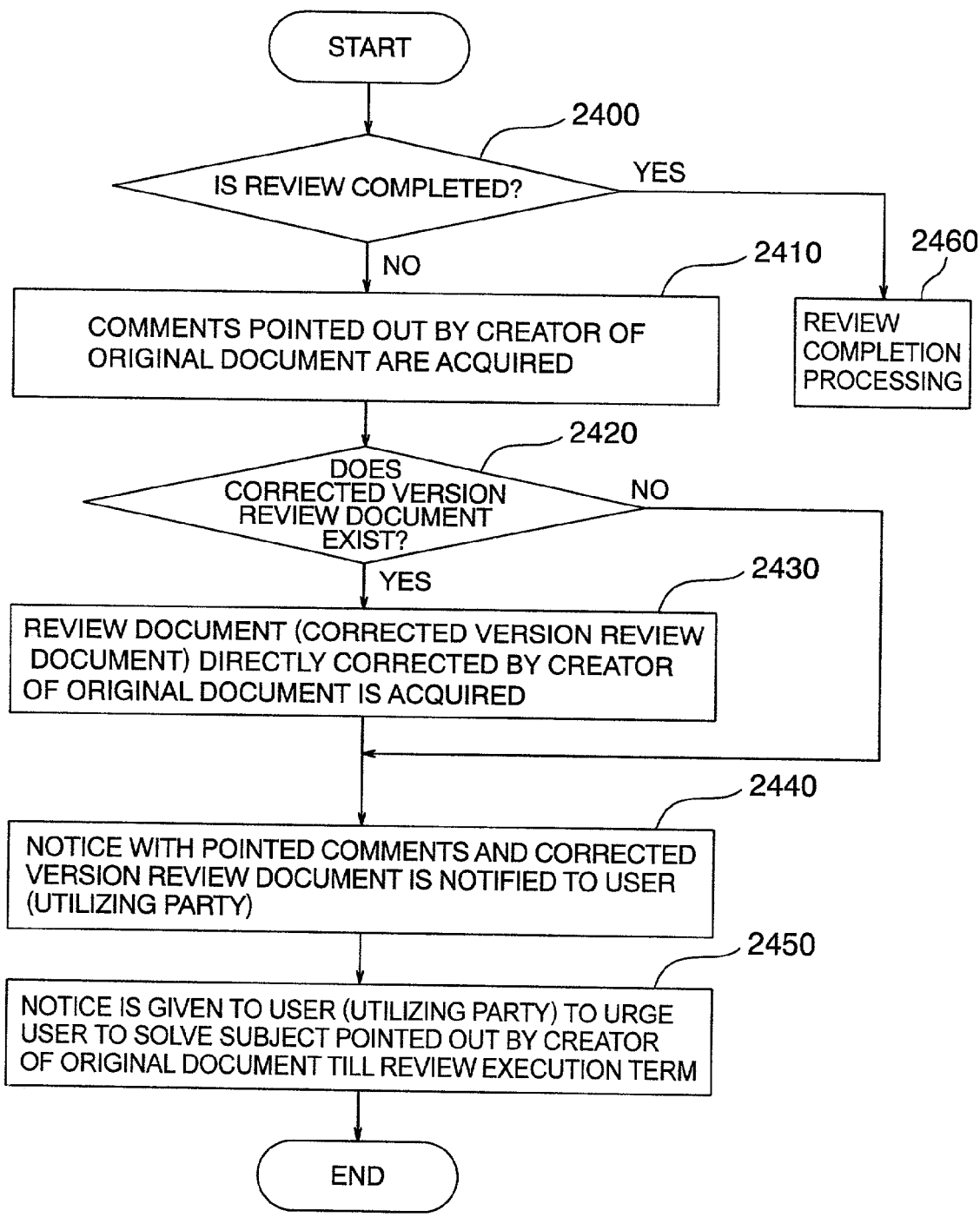
FIG. 11 is flowchart showing a procedure of a document review execution processing in the document management system described above.

Next, a concrete processing procedure of a document review execution processing of the document utilization management program 140 of this embodiment will be explained with reference to the flowchart shown in FIG. 11.

Step 2400:
Whether or not an instruction from a user is review completion is judged. When the result is YES, the flow proceeds to Step 2460 and when it is NO, to Step 2410.

Step 2410:
Comments pointed out by the creator of the original document are acquired.

Step 2420:
Whether or not a revised version document exists is judged. In other words, whether or not the person who conducts the review directly puts any comments or addition or corrections to the review document is judged. When the result is YES, the flow proceeds to Step 2430 and when it is NO, to Step 2440.

Step 2430:
The review document directly corrected by the creator of the original document is acquired.

Step 2440:
Notice is given to the user (utilizing party) together with the comments pointed out and the revised version review document.

Step 2450:
Notice is given to the user (utilizing party) to urge the user to solve the points pointed out by the creator of the original document till the review execution term.

Step 2460:
Review completion processing.

The above explains a concrete processing procedure of the document review execution processing of the document utilization management program 140 in this embodiment.

Figure 12:
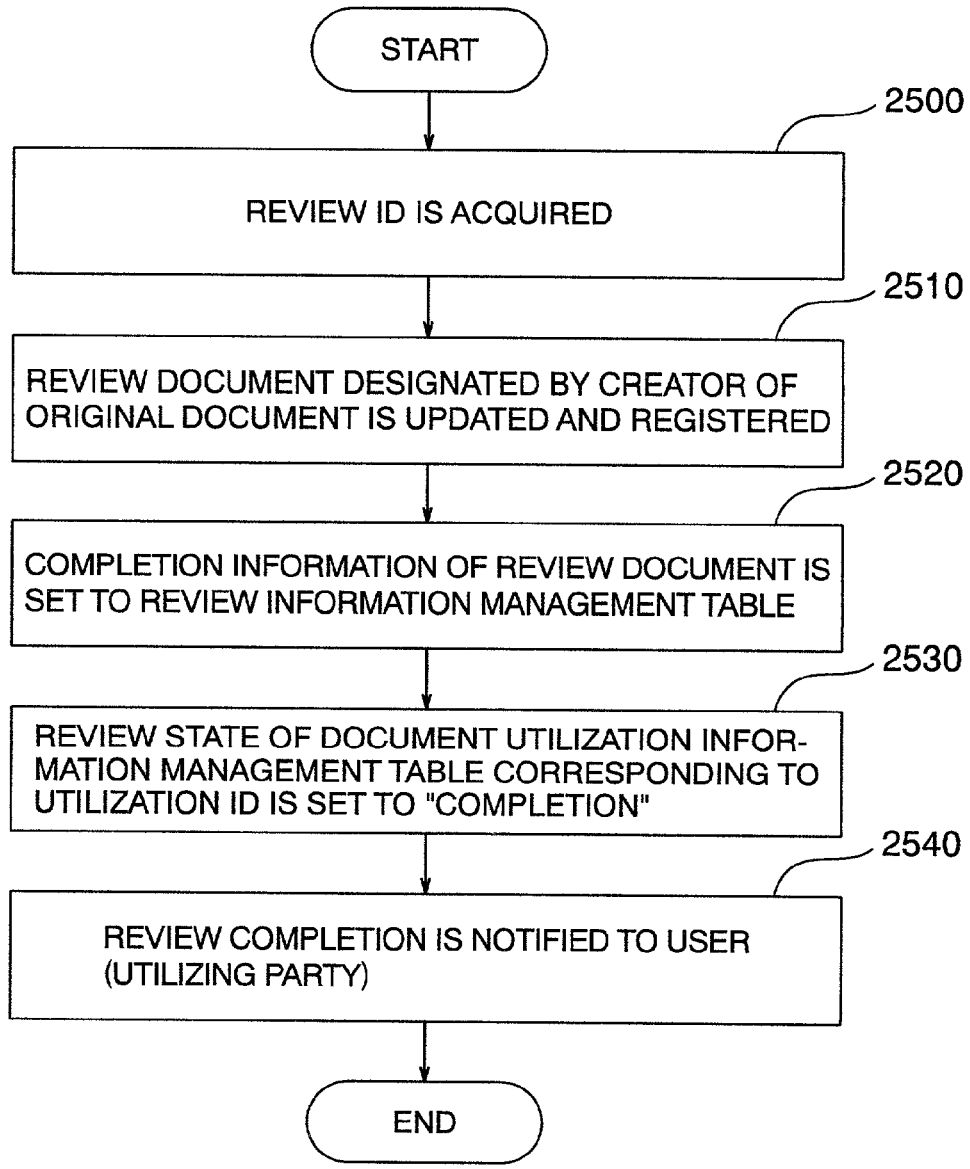
FIG. 12 is flowchart showing a procedure of a document review completion processing in the document management system described above.

Next, a concrete processing procedure of the document review completion processing of the document utilization management program 140 of this embodiment will be explained with reference to the flowchart shown in FIG. 12.

Step 2500:
A review ID is acquired.

Step 2510:
A review document designated by the creator of the original document is updated and registered. A sub-rendition of the review document is generated and property is set.

Step 2520:
Completion information of the review document is set to the review information management table.

Step 2530:
The review condition of the document utilization information management table corresponding to the utilization ID is set to "completion".

Step 2540:
Review completion is notified to the user (utilizing party).

The above explains a concrete processing procedure of the document review completion processing of the document utilization management program 140 of this embodiment.

Next, updating of the properties of the document data with review submission and review completion will be illustrated concretely. FIG. 13 shows the properties of the document data set at the time of review submission. As shown in FIG. 13, the user "A" utilizes again the original document "Proposal XYZ", creates a "Proposal ABC" and conducts review submission. This review document is registered to the document database, and a document ID "D055" is allocated. In other words, when review submission is conducted, the review document can be shared between the user and the creator of the original document.

In this embodiment, sub-rendition is not yet created at the time of review submission but has to wait for completion of the review. This is because only the master rendition is adopted so that the original creator can correct and add the review document. On the other hand, when review is conducted on the premise of sub-rendition of the review document, sub-rendition may well be created simultaneously with its submission.

FIG. 14 shows the property values of the document data after review completion. Since the property "updating version number" is "R2" in FIG. 14, it can be understood that the "Proposal ABC" is versioned up once during review.

Figure 15:
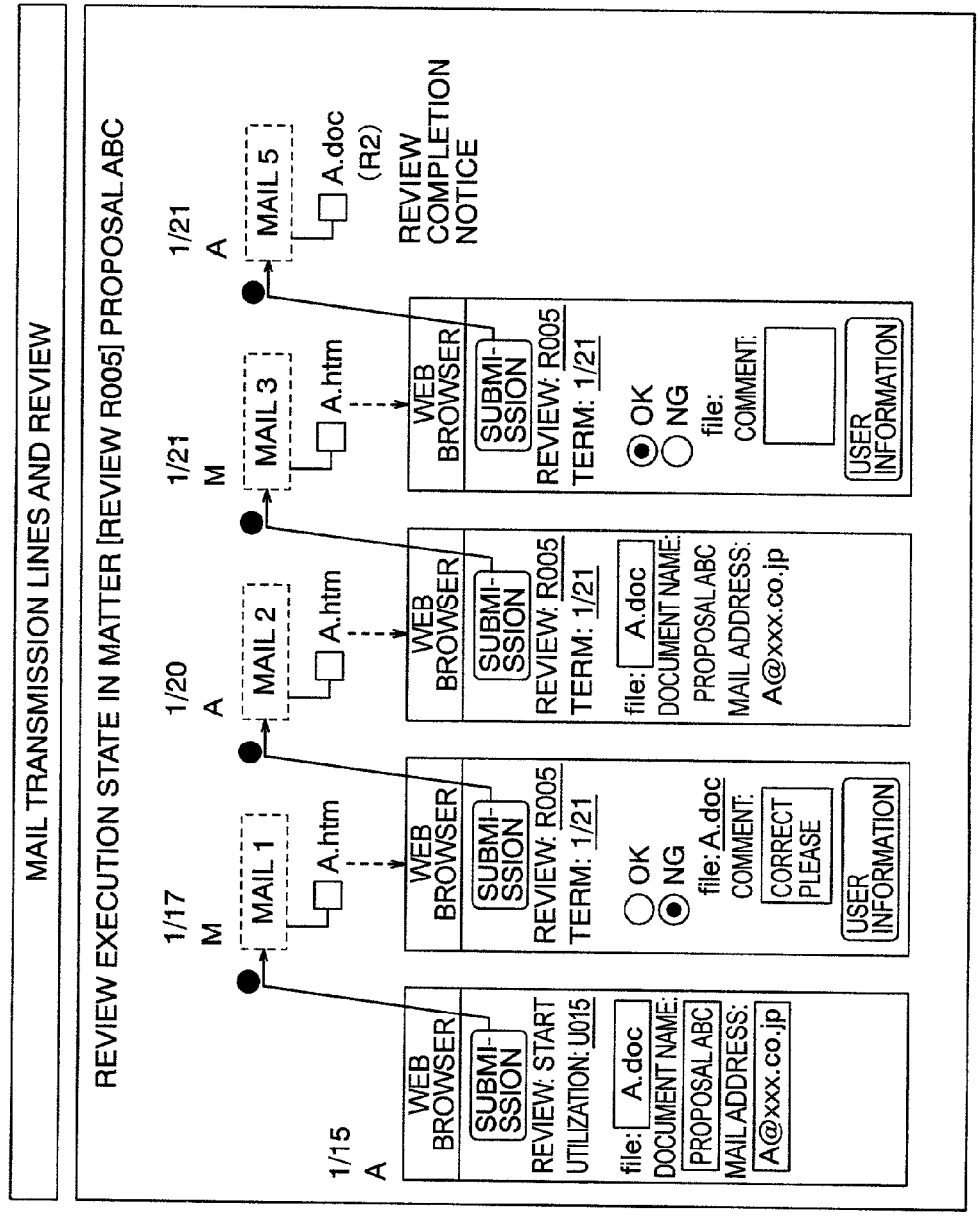
FIG. 15 shows a concept of a mail transmission line and a review execution state in the document management system described above.

FIG. 15 is a conceptual view showing mail transmission lines and the flow of review execution. The mails are always transmitted by the command of the Web browser. Arrow indicates a transmission address of each mail. Each mail includes the transmission date, the transmission party and the attached document. Each attached document represents the document name and the version number (R2).

In FIG. 15, black circle ● attached to the arrow of the mail transmission represents a processing of the mail document automatic registration system. In other words, the mail document automatic registration system registers all the history of the mail exchanges in the review and the updating history of the review documents attached to the mail to the document database 50. Here, both the user and the creator of the original document not only can share the information of the review document but can manage review execution and record the execution condition by using only the Web browser and the mail without calling for a specific application. Further, they can make version management of the review document.

The above explains the conceptual view showing the mail transmission line and the flow of review execution in this embodiment.

Figure 16:
FIG. 16 shows an example of a notice mail review-submitted by a Web browser in the document management system described above.

FIG. 16 typically shows the content of the mail 1 in the conceptual view of FIG. 15, that is, the content of the mail automatically transmitted at the time of review submission. Receiving this mail, the creator "M", of the original document clicks the attached file "A.htm" and can start up the review execution screen of the Web browser.

Figure 17:
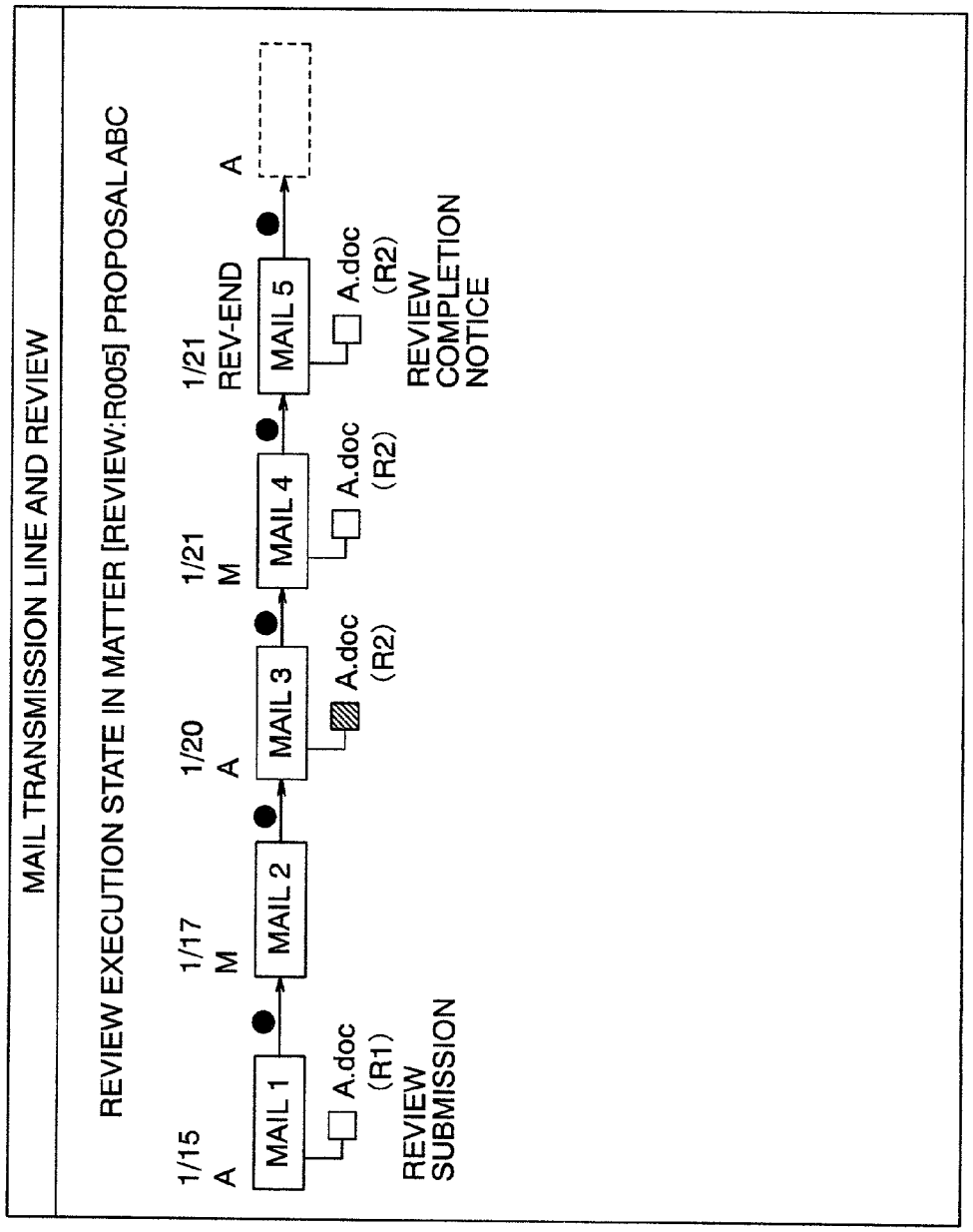
FIG. 17 shows a concept of a mail transmission line and a review execution state in a document management system according to the second embodiment.

Next, a method based on the premise that review is executed through mail will be explained as the second embodiment of the present invention. Review execution in this embodiment can be made by use of only mail, too. FIG. 17 is a conceptual view showing mail transmission lines and the flow of review execution on the premise that review is executed through mail. Black circles ● in FIG. 17, too, represent a processing of a mail document automatic registration system. The flow of this review processing will be concretely explained.

Mail 1:
The user "A" transmits (submits) the review document "A.doc" to the creator "M" of the original document.

Mail 2:
The creator "M" reviews the document and returns a mail 2 pointing out the problems to the user "A".

Mail 3:
The user "A" returns an "R2" version correcting the review document "A.doc" to "M".

Mail 4:
The creator "M" reviews the document, judges that no problem exists, and transfers the mail with the latest version of the review document to a review completion agent "Rev-end". This "Rev-end" is the document management system itself.

Mail 5:
The review completion agent notifies review completion to "A".

The above explains the second embodiment of the present invention.

Figure 18:
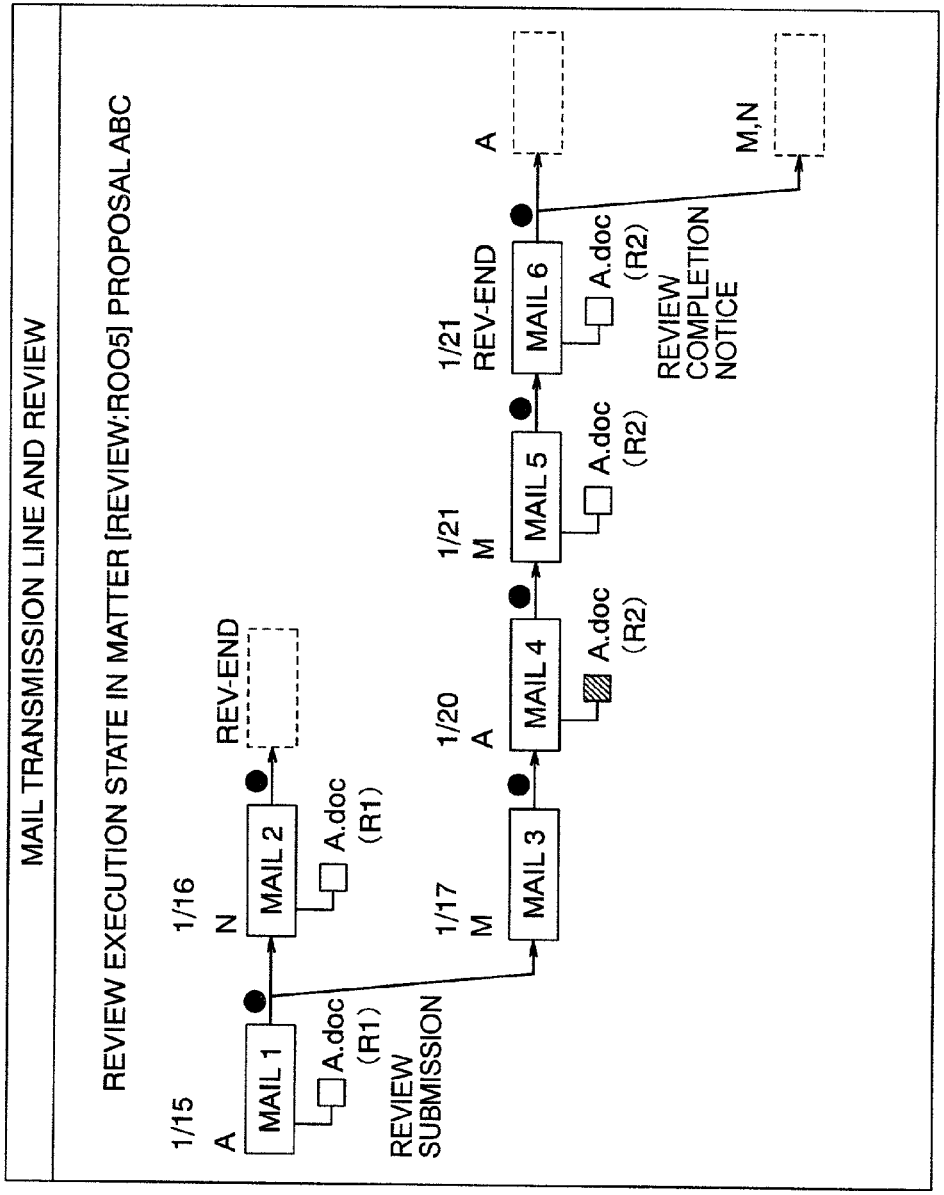
FIG. 18 shows a concept of a mail transmission line and a review execution state in a document management system according to the third embodiment.

Further, a method based on the premise that a plurality of reviews is executed through mail will be explained as the third embodiment of the present invention. FIG. 18 shows the flow of processing when the original document is two, that is, a document ID "D007" and a document ID "D003". Individual description is the same as that of FIG. 17. In the example shown in FIG. 18, the creator "N" of the original document judges review completion in the mail 2 and the creator "M" of another original document judges review completion in the mail 5. After receiving these two review completion notices, the review completion agent notifies review completion to "A" and "M, N".

FIGS. 19 and 20 show the setting condition of each table in the same way as FIGS. 8 and 10, respectively.

Figure 21:
FIG. 21 shows an example of a notice mail when review-submission is made by mail in the document management system according to the third embodiment.

FIG. 21 shows an example of a notice mail when review is submitted through mail. FIG. 21 shows typically the content of the mail the user "A" returns in mail 1 in the conceptual view of FIG. 18, that is, at the time of mail submission. When review submission is made through mail, a tag "review" is put to the Subject of the mail, and the mail is transmitted with the review document "A.doc". The mail document automatic registration system starts the review submission processing on the basis of this tag "review". Since the review ID is decided in this processing, the Subject of the mail has changed to "Review: R005" by the time when the creator "N" of the original document receives the mail 2. This also holds true of the mail 3 that the creator "M", of the original document receives. Receiving this mail, the creators "M" and "N" of the original documents click the attached file "A.doc" and can thus confirm the review document.

The above explains the third embodiment of the present invention.

As explained above in detail, the present invention not only can accomplish information sharing but also offers a higher incentive to users providing a document or documents having higher quality, accelerates the positive (promotion) factors on the document provider side, and can promote and activate information sharing.

When documents of the handle-with-care class containing confidential information such as client information are utilized, the present invention can check the client information from leaking out as such, gives the sense of security to the document prover side and can eliminate the negative factors of information sharing. Therefore, the present invention can further activate information sharing.

What is claimed is:

1. A computer-implemented document information management method for opening document information to a plurality of users, comprising the steps of:
    managing each of said document information in an editable form and in a reference-only form;
    offering said document information in the editable form to users desiring re-utilizing of said document information; and
    tracing and managing the utilization state of said document information when said document information is re-utilized,
    wherein, when said document information is re- re-utilized, said step of tracing and managing a subsequent re-utilization state of said document information comprises the steps of:

causing a re-utilizing user who re-utilizes said document information to submit the re-utilizing document information for a review;

presenting a subsequent re-utilization state after re-utilization of said document information to a creator of said document information;

if said creator accepts the contents of said re-utilizing document information, notifying said re-utilizing user of completion of the review; and if said creator did not accept a content of said re-utilizing document information and pointed out a problem, notifying said re-utilizing user of no-completion of the review of said re-utilizing document information, urging said re-utilizing user to solve said problem.

2. The document information management method according to claim 1, wherein, when said document information is offered in the editable form to users desiring re-utilizing of said document information, information of a re-utilizing party of said document information is notified to a creator of said document information.

3. The document information management method according to claim 1, wherein, when said document information is re-utilized, said document information after re-utilizing is sent to a creator of said document information.

4. The document information management method according to claim 1, wherein commentary information made by a creator of said document information is notified to a re-utilizing party of said document.

5. The document information management method according to claim 1, wherein, when said document information is re-utilized and a subsequent utilization state of said document information is traced and managed, a time limit is set to complete a review of the re-utilized document information and a creator and a re-utilizing user is prompted to complete review based on the time limit.

* * * * *